(12) United States Patent
Bartlett et al.

(10) Patent No.: US 8,017,270 B2
(45) Date of Patent: Sep. 13, 2011

(54) ELECTROCHEMICAL CELL FABRICATED VIA LIQUID CRYSTAL TEMPLATING

(75) Inventors: Philip Nigel Bartlett, Alresford (GB); John Robert Owen, Southampton (GB); Phillip A Nelson, Southampton (GB)

(73) Assignee: University of Southampton, Southampton (GB)

( * ) Notice: Subject to any disclaimer, the term of this patent is extended or adjusted under 35 U.S.C. 154(b) by 1081 days.

(21) Appl. No.: 10/538,771

(22) PCT Filed: Dec. 12, 2003

(86) PCT No.: PCT/GB03/05441
§ 371 (c)(1),
(2), (4) Date: Dec. 12, 2007

(87) PCT Pub. No.: WO2004/054015
PCT Pub. Date: Jun. 24, 2004

(65) Prior Publication Data
US 2010/0273053 A1    Oct. 28, 2010

(30) Foreign Application Priority Data
Dec. 12, 2002  (GB) .................................. 0229080.7

(51) Int. Cl.
*H01M 4/13*      (2010.01)
*H01M 4/58*      (2010.01)
*H01M 4/00*      (2010.01)

(52) U.S. Cl. ..... 429/223; 429/212; 429/221; 429/218.1; 429/231.8; 429/231.9; 977/948

(58) Field of Classification Search ............... 429/223, 429/218.1, 231.8, 212, 221, 231.9; 977/948
See application file for complete search history.

(56) References Cited

U.S. PATENT DOCUMENTS

| 6,153,334 A  | * | 11/2000 | Sakamoto et al. | ............ 429/223 |
| 6,203,925 B1 |   | 3/2001  | Goeltner        |                      |
| 6,331,367 B1 | * | 12/2001 | Ebihara et al.  | ............ 429/218.2 |

FOREIGN PATENT DOCUMENTS

| EP | 1115130    | 7/2001  |
| EP | 1244168    | 9/2002  |
| WO | WO 99/00536 | 1/1999  |
| WO | WO 01/89991 | 11/2001 |

OTHER PUBLICATIONS

Attard et al., "Liquid crystal phase templated mesoporous platinum alloy", 2001, Microporous and Mesoporous Materials 44-45, pp. 159-163.*

(Continued)

*Primary Examiner* — Patrick Ryan
*Assistant Examiner* — Julian Anthony
(74) *Attorney, Agent, or Firm* — Pearl Cohen Zedek Latzer, LLP (57) ABSTRACT

An electrochemical cell comprising a cathode, an anode and an electrolyte is provided, wherein:
the cathode comprises mesoporous nickel having a periodic arrangement of substantially uniformly sized pores of cross-section of the order of $10^{-8}$ to $10^{-9}$ m; and
the anode comprises a mesoporous material having a periodic arrangement of substantially uniformly sized pores of cross-section of the order of $10^{-8}$ to $10^{-9}$ m and selected from: carbon, cadmium, iron, a palladium/nickel alloy, an iron/titanium alloy, palladium or a mixed metal hydride.

17 Claims, 8 Drawing Sheets

OTHER PUBLICATIONS

Nelson P.A., et al: "Mesoporous Nickel/Nickel Oxide Electrodes for High Power Applications," Journal of New Materials for Electrochemical Systems, Ecole Polytechnique de Montreal, Montreal, CA, vol. 5, No. 1, Jan. 2002, pp. 63-65, XP001046009.

Nelson P.A., et al: "Mesoporous Nick/Nickel Oxide—A Nanoarchitectured Electorode," Chemistry of Materials, American Chemical Society, Washington, US, vol. 14, No. 2, Feb. 2002, pp. 524-529, XP001163942.

Attard, G.S., et al: "Mesoporous Pt/Ru Alloy from the Hexagonal Lyotropic Liquid Crystalline Phase of a NonIonic Sufactant," Chem. Material, Apr. 27, 2001, pp. 1444-1446, XP002306570.

International Search Report for PCT/GB/03/05441.

* cited by examiner

ELECTROCHEMICAL CELL FABRICATED VIA LIQUID CRYSTAL TEMPLATING

CROSS-REFERENCE TO RELATED APPLICATIONS

This application is a National Phase Application of PCT International Application No. PCT/GB2003/005441, International Filing Date 12 December, 2003, claiming priority of UK Patent Application GB 0229080.7, filed 12 Dec. 2002, which are hereby incorporated by reference in their entirety.

FIELD OF THE INVENTION

The present invention relates to a novel electrochemical cell, which may be a battery or a supercapacitor or both, and in which the positive and negative electrodes are both made of a mesoporous material having a periodic arrangement of substantially uniformly sized pores of cross-section of the order of $10^{-8}$ to $10^{-9}$ m.

BACKGROUND OF THE INVENTION

Mesoporous materials which may be used for the manufacture of the electrodes used in the electrochemical cells of the present invention are described in general terms, for example, in EP 993 512 or U.S. Pat. No. 6,203,925.

SUMMARY OF THE INVENTION

Thus, the present invention consists in an electrochemical cell comprising a cathode, an anode and an electrolyte, wherein:
the cathode comprises mesoporous nickel having a periodic arrangement of substantially uniformly sized pores of cross-section of the order of $10^{-8}$ to $10^{-9}$ m; and
the anode comprises a mesoporous material having a periodic arrangement of substantially uniformly sized pores of cross-section of the order of $10^{-8}$ to $10^{-9}$ m and selected from: carbon, cadmium, iron, a palladium/nickel alloy, an iron/titanium alloy, palladium or a mixed metal hydride.

Such electrochemical cells have the advantage of providing both high power and high energy densities.

BRIEF DESCRIPTION OF THE DRAWINGS

The invention is illustrated by the following non-limiting examples, with reference to the Figures, in which.

DETAILED DESCRIPTION OF THE INVENTION

The material used to manufacture the negative electrode, the anode, is preferably carbon or palladium. Mesoporous palladium is, however, not the preferred negative electrode material for low cost applications, due to its high cost.

The mesoporous cathode and mesoporous anode each consists of or consists substantially of the mesoporous structure or structures as defined.

By "mesoporous structure", "mesoporous material" and "mesoporous film" as referred to herein are meant structures, materials and films, respectively, that have been fabricated via a liquid crystal templating process, and that consequently are monolithic in nature, and contain a long range, regular arrangement of pores having a defined topology and a substantially uniform pore size (diameter). Accordingly, the mesoporous structures, materials and films may also be described as nanostructured or having nanoarchitecture.

Therefore, the mesoporous materials used in accordance with the invention are distinct from poorly crystallised materials and from composites with discrete nano-sized solid grains, e.g. conventionally denoted 'nanomaterials' that are composed of aggregated nanoparticulates.

An advantage of using mesoporous materials, compared with nanomaterials, is that electron transport within the mesoporous material does not encounter grain boundary resistances, affording superior electronic conductivity and removing power losses associated with this phenomenon. Moreover, the ordered porosity of the mesoporous materials used here provides a continuous and relatively straight, non-tortuous path of flow with uniform diameter, encouraging the rapid and unhindered movement of electrolyte species. By contrast, conventional nanoparticulate systems have a disordered porosity with voids of varying cross section interconnected by narrower intervoid spaces. As such, substances moving within the pore structure encounter a considerably tortuous path, impeding reaction rates.

The mesoporous material is preferably in the form of a film of substantially constant thickness. Preferably, the mesoporous film thickness is in the range from 0.5 to 5 micrometers.

Preferably, the mesoporous material has a pore diameter within the range from about 1 to 10 nanometres, more preferably within the range from 2.0 to 8.0 nm.

The mesoporous material may exhibit pore number densities in the range from $1 \times 10^{10}$ to $1 \times 10^{14}$ pores per cm$^2$, preferably from $4 \times 10^{11}$ to $3 \times 10^{13}$ pores per cm$^2$, and more preferably from $1 \times 10^{12}$ to $1 \times 10^{13}$ pores per cm$^2$.

The mesoporous material has pores of substantially uniform size. By "substantially uniform" is meant that at least 75%, for example 80% to 95%, of pores have pore diameters to within 30%, preferably within 10%, and most preferably within 5%, of average pore diameter. More preferably, at least 85%, for example 90% to 95%, of pores have pore diameters to within 30%, preferably within 10%, and most preferably within 5%, of average pore diameter.

The pores are preferably cylindrical in cross-section, and preferably are present or extend throughout the mesoporous material.

The mesoporous structure has a periodic arrangement of pores having a defined, recognisable topology or architecture, for example cubic, lamellar, oblique, centred rectangular, body-centred orthorhombic, body-centred tetragonal, rhombohedral, hexagonal. Preferably, the mesoporous structure has a periodic pore arrangement that is hexagonal, in which the electrode is perforated by a hexagonally oriented array of pores that are of uniform diameter and continuous through the thickness of the electrode.

In the preferred case where the pore arrangement is hexagonal, the arrangement of pores has a regular pore periodicity, corresponding to the centre-to-centre pore spacing, preferably in the range from 3 to 15 nm, more preferably in the range from 5 to 9 nm.

Moreover, the mesoporous structure having this regular periodicity and substantially uniform pore size should extend over a portion of the electrode of the order of at least 10 times, preferably at least 100 times, the average pore size. Preferably, the electrode consists of or consists substantially of a structure or structures as defined.

It will be appreciated that these pore topologies are not restricted to ideal mathematical topologies, but may include distortions or other modifications of these topologies, provided recognisable architecture or topological order is present in the spatial arrangement of the pores in the film. Thus, term "hexagonal" as used herein encompasses not only materials that exhibit mathematically perfect hexagonal symmetry within the limits of experimental measurement, but also those with significant observable deviations from the ideal state, provided that most channels are surrounded by an average of six nearest-neighbour channels at substantially the same distance. Similarly, the term "cubic" as used herein encompasses not only materials that exhibit mathematically perfect symmetry belonging to cubic space groups within the limits of experimental measurement, but also those with significant observable deviations from the ideal state, provided that most channels are connected to between two and six other channels.

The electrolyte in the cell is preferably an aqueous electrolyte, for example an aqueous alkaline electrolyte such as aqueous potassium hydroxide or aqueous lithium hydroxide.

In a preferred embodiment, the mesoporous structure of the nickel cathode comprises nickel and an oxide, hydroxide or oxy-hydroxide of nickel selected from nickel oxide (NiO), nickel hydroxide ($Ni(OH)_2$) and nickel oxy-hydroxide (NiOOH), said nickel oxide, hydroxide or oxy-hydroxide forming a surface layer over said nickel and extending over at least the pore surfaces, and the anode has a mesoporous structure of carbon or palladium. When filled with electrolyte, the positive electrode represents a three-phase composite composed of an interconnected Ni current collector base, coated with $Ni(OH)_2$ active material which is in contact with the electrolyte. Advantageously, the hydrous structure of the mesoporous Ni positive electrode is retained such that both surface and bulk processes can contribute to the charge capacity of the electrode. Due to the nanoscale structure of the electrode, all three phases are in either in intimate contact or within about 1-2 nm of each other and the overall surface area of the 'phase boundaries' is extremely high. Hence, a high energy density can be achieved, whilst the small proton diffusion distance enables the cell to exhibit very high power density.

As is well known in the field, nickel requires "conditioning" before use. This may be achieved by putting the cell through several cycles of charging and discharging, as is conventional in the art. As a result of the conditioning, the nickel will acquire a surface layer of an oxide.

The mesoporous materials used as the positive and the negative electrodes of the electrochemical cells of the present invention are prepared by a liquid crystal templating method, and preferably are deposited as films on a substrate by electrochemical deposition from a lyotropic liquid crystalline phase. They may also be prepared by electro-less deposition, such as by chemical reduction from a lyotropic liquid crystalline phase.

Suitable substrates include gold, copper, silver, aluminium, nickel, rhodium or cobalt, or an alloy containing any of these metals, or phosphorus. The substrate may, if desired, be microporous, with pores of a size preferably in the range from 1 to 20 micrometers. The substrate preferably has a thickness in the range from 2 to 50 micrometers. The substrate preferably is a substrate as above, other than gold, having a layer of gold formed on it by vapour deposition.

Suitable methods for depositing mesoporous materials as films onto a substrate by electrochemical deposition and chemical means are known in the art. For example, suitable electrochemical deposition methods are disclosed in EP-A-993,512; Nelson, et al., "*Mesoporous Nickel/Nickel Oxide Electrodes for High Power Applications*", J. New Mat. Electrochem. Systems, 5, 63-65 (2002); Nelson, et al., "*Mesoporous Nickel/Nickel Oxide—a Nanoarchitectured Electrode*", Chem. Mater., 2002, 14, 524-529. Suitable chemical reduction methods are disclosed in U.S. Pat. No. 6,203,925.

Preferably, the mesoporous material is formed by electrochemical deposition from a lyotropic liquid crystalline phase. According to a general method, a template is formed by self-assembly from certain long-chain surfactants and water into a desired liquid crystal phase, such as a hexagonal phase. Suitable surfactants include octaethylene glycol monohexadecyl ether ($C_{16}EO_8$), which has a long hydrophobic hydrocarbon tail attached to a hydrophilic oligoether head group. Others include the polydisperse surfactants Brij®56 ($C_{16}EO_n$ where n~10), Brij®78 ($C_{16}EO_n$ where n~20), and Pluronic 123, each available from Aldrich. At high (>30%) aqueous concentrations, and dependent on the concentration and temperature used, the aqueous solution can be stabilised in a desired lyotropic liquid crystal phase, for example a hexagonal phase, consisting of separate hydrophilic and hydrophobic domains, with the aqueous solution being confined to the hydrophilic domain. Dissolved inorganic salts, for example nickel acetate, will also be confined to the hydrophilic domain, and may be electro-reduced at an electrode immersed in the solution, to form a solid mesophase, for example of nickel metal, that is a direct cast of the aqueous domain phase structure. Subsequent removal of the surfactant, by washing in a suitable solvent, leaves a regular periodic array of pores in the electro-reduced solid, the arrangement of the pores being determined by the lyotropic liquid crystal phase selected. The topology, size, periodicity and other pore characteristics may be varied by appropriate selection of the surfactant, solvent, metal salts, hydrophobic additives, concentrations, temperature, and deposition conditions, as is known in the art.

As noted above, the mesoporous material of which the mesoporous electrode is made is preferably formed by electrodeposition or chemical deposition on a substrate. Since the mesoporous material may lack adequate mechanical strength, it is preferably used as an electrode on a substrate, and, for convenience, this is preferably the same substrate as was used in its preparation.

It should be noted that the term "battery" is used herein in its common meaning of a device that converts the chemical energy contained in its active components directly into electrical energy by means of a redox (oxidation-reduction) reaction. The basic unit of a battery is an electrochemical cell, which will comprise at least a positive electrode, a negative electrode and an electrolyte, the whole contained within a casing. Other components, such as separators, may be included, as is well known in the art. A battery may consist of one or more such cells.

The invention is further illustrated by the following non-limiting Examples.

Example 1

Electrodeposition of Nickel from an Hexagonal Liquid Crystalline Phase:

A mixture having normal topology hexagonal phase was prepared from 50 wt % of an aqueous solution of 0.2 M nickel (II) sulphate, 0.58 M boric acid, and 50 wt % of octaethylene glycol monohexadecyl ether ($C_{16}EO_8$). Electrodeposition onto polished gold electrodes was carried out potentiostatically at 25° C. using a platinum gauze counterelectrode. The cell potential difference was stepped to −1.0 V versus the saturated calomel electrode until a charge of 1 coulomb per centimetre squared was passed. After deposition the films were rinsed with copious amounts of deionised water to remove the surfactant. The washed nanostructured deposits were uniform and shiny in appearance. Small angle X-ray diffraction studies of the electrodeposited tin revealed a lattice periodicity of 58 Å, while transmission electron microscopy studies revealed a highly porous structure consisting of cylindrical holes with internal diameters of 34 Å separated by nickel walls 28 Å thick.

Example 2

Preparation of Mesoporous Nickel and Mesoporous Palladium Electrodes:

(i) Preparation of Gold Substrate:

Gold discs (200 µm or 1 mm diameter) encased in an epoxy insulator, and thin film gold electrodes (approximately 1 cm²) made by evaporation of gold onto chromium-coated glass microscope slides, were prepared as follows, for subsequent deposition of mesoporous nickel and palladium electrodes:

The gold disc electrodes were cleaned by first polishing consecutively on 25 µm, 1 µm and 0.3 µm alumina (obtained from Buehler) embedded microcloths then cycling the electrodes between −0.6 V and 1.4 V vs. a saturated mercury sulphate reference electrode (SMSE) at 200 mVs$^{-1}$ for 5 min. in 2 M $H_2SO_4$ solution. With each cycle, a monolayer of gold oxide was formed and subsequently removed from the electrode surface.

The evaporated gold electrodes were cleaned in an ultrasonic bath of isopropanol for 60 minutes prior to deposition, then rinsed with de-ionized water and dried under ambient conditions.

(ii) Electrodeposition of Nickel from an Hexagonal Liquid Crystalline Phase:

A mixture having normal topology hexagonal ($H_I$) phase was prepared from 35 wt % of an aqueous solution of 0.2 M nickel (II) acetate, 0.5 M sodium acetate and 0.2 M boric acid, and 65 wt % of Brij® 56 nonionic surfactant ($C_{16}EO_n$ wherein n~10, from Aldrich), and electrodeposition onto polished gold substrate was carried out potentiostatically at 25° C. using a platinum gauze counterelectrode, according to the method disclosed in Nelson et al., Chem. Mater., 2002, 14, 524-529. After deposition the films were washed in copious amounts of isopropanol for 24 hrs to remove the surfactant. A mesoporous nickel film of approximately 1 micrometer thickness and having an hexagonal arrangement of pores was obtained.

(iii) Electrodeposition of Palladium from an Hexagonal Liquid Crystalline Phase:

A mixture having normal topology hexagonal ($H_I$) phase was prepared from 35 wt % of an aqueous solution of 0.5 M ammonium tetrachloropalladate Premion, from Alfa Aesar), and 65 wt % of Brij® 56 nonionic surfactant ($C_{16}EO_n$ wherein n~10, from Aldrich). The presence of the $H_I$ liquid crystalline phase in the palladium deposition template solution at 25° C. was confirmed using polarising light microscopy. Electrodeposition onto polished gold substrate was carried out potentiostatically at 25° C. using a platinum gauze counterelectrode, according to the electrodeposition method disclosed in Bartlett et al., Phys. Chem. Chem. Phys., 2002, 4, 3835-3842, using the modified templating solution above. After deposition the films were washed in copious amounts of isopropanol for 24 hrs to remove the surfactant. A mesoporous palladium film of approximately 1 micrometer thickness and having an hexagonal arrangement of pores was obtained.

(iv) Actuation of Electrodeposited Mesoporous Ni and Pd Electrodes:

The deposited mesoporous electrodes, as prepared in (ii) and (iii) above, were individually examined by cyclic voltammetry prior to assembly of the supercapacitor. This was done in a three electrode cell containing 6 M KOH solution. The cell consisted of a Pyrex water-jacketed cell connected to a Grant ZD thermostated water bath, mercury/mercury oxide (6 M KOH) reference electrode (Hg/HgO) and a large area Pt gauze counter electrode. All experiments were carried out at 25° C. and potentials in experiments involving a reference electrode are quoted against the Hg/HgO reference.

The efficiency of the mesoporous nickel deposition process was quantified by anodic stripping voltammetry. This involved scanning the potential of a mesoporous nickel working electrode between −0.45 V and 0.9 V vs. a saturated calomel reference electrode (SCE) in 0.2 M HCl solution at 1 mV s$^{-1}$. The counter electrode was Pt gauze. The charge associated with the anodic nickel dissolution peak and comparison of this charge with the deposition charge gave a deposition efficiency of 34%.

Cyclic voltammetry and potential step experiments were done using a custom made potentiostat and ramp generator interfaced with a National Instruments data acquisition card and LabVIEW software.

Figure 1:
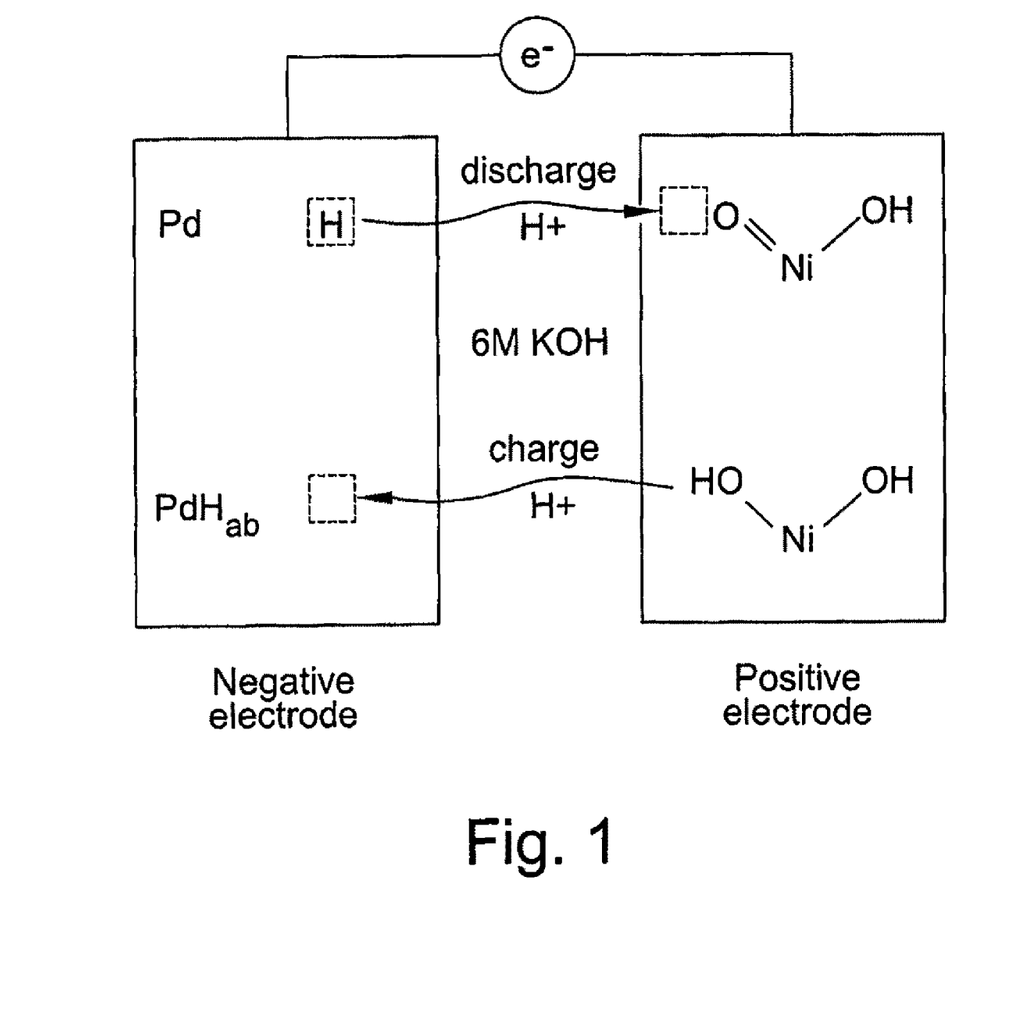
FIG. 1 represents a schematic drawing showing the flow of protons on charge and discharge to and from a Pd lattice into a NiOOH positive electrode proton sink.
Figure 2:
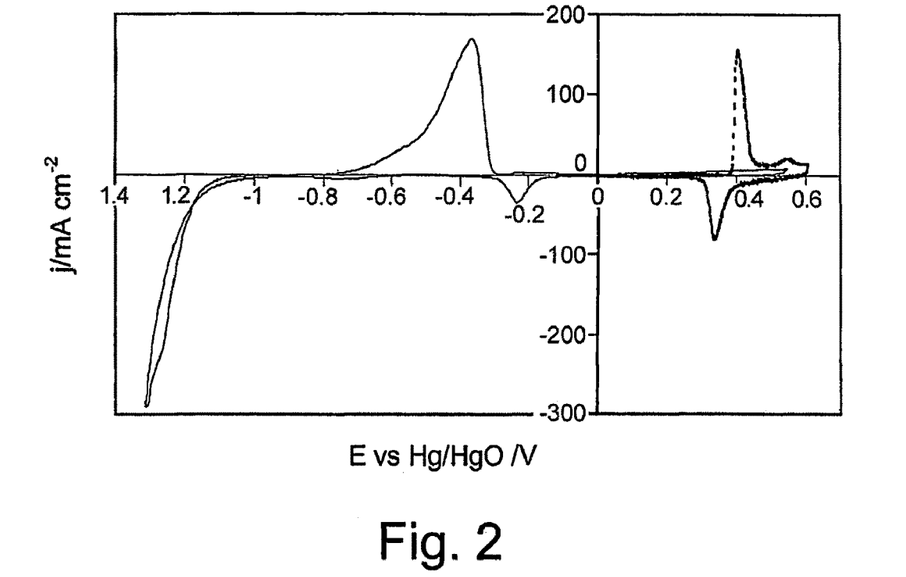
FIG. 2 shows a comparison of the cyclic voltammetry of a 1 mm diameter $H_I$Pd disc (—) with that of a 200 ?m $H_I$Ni disc (- - - -) in 6 M KOH at 20 mV s$^{-1}$.

In order to compare the electrochemical characteristics of mesoporous Ni and mesoporous Pd, the cyclic voltammograms of both of these electrodes in 6 M KOH are overlaid in FIG. 2. The anodic peak for Ni at 0.38 V vs. Hg/HgO shows oxidation of Ni(OH)$_2$ to NiOOH via Reaction (1) with subsequent reduction back to Ni(OH)$_2$ represented by the cathodic peak commencing at 0.4 V. The latter peak represents the proton storage capacity of the electrode, that is, the reversible capacity of the electrode for proton storage. In FIG. 2, this is 295 mC cm$^{-2}$.

The electrochemistry of $H_I$Pd in 6 M KOH is more diverse with anodic currents due to oxide formation at positive potentials and subsequent stripping of this oxide with the cathodic peak at −0.25 V. Adsorption of hydrogen adatoms onto the Pd surface by formation of the surface palladium hydride is indicated by the small cathodic peak at around −0.75 V followed by the more substantial hydrogen absorption into the Pd lattice indicated by the large current superimposed on the hydrogen evolution current at potentials below −1 V. On reversal of potential in the positive direction hydrogen begins to desorb from the Pd as represented by the large anodic peak commencing at −0.8 V and peaking at −0.36 V. Based on comparison of the voltammetry of mesoporous Ni and mesoporous Pd, it may be expected that a charge storage device using these 2 electrodes would have a discharge voltage of approximately 1.2 V since this is approximately the potential difference between the onset of $H^+$ desorption from Pd (−0.8 V vs. Hg/HgO) and the intercalation of $H^+$ into NiOOH (0.4 V vs. Hg/HgO). This discharge voltage is variable with the state of charge of the Pd which can vary between −0.8 V vs. Hg/HgO for a fully charged electrode to −0.3 V vs. Hg/HgO where the Pd is fully discharged of hydrogen at 20 mV $s^{-1}$.

(v) Assembly and Testing of Charge/Discharge Characteristics of Electrochemical Cell:

In order to study the performance and limitations of mesoporous nickel in an electrochemical cell configuration, a negative electrode with higher capacity and power capability was needed. For this purpose, liquid crystal templated mesoporous palladium, as prepared in (iii) above, was used. The size of the mesoporous palladium electrode was made significantly larger than the mesoporous nickel electrode such that performance limitations would be due to limitations in the nickel electrode.

Accordingly, a two-electrode electrochemical cell without a separator was assembled using a 200 μm diameter mesoporous nickel positive electrode of approximately 1 μm thickness in conjunction with a 1 $cm^2$ mesoporous palladium electrode separated by 1 cm in 6 M KOH solution. The deposition charge in synthesis of the mesoporous nickel in this case, as prepared in (ii) above, was −1.13 mC, which corresponds to a mass of 0.117 μg when taking into account a deposition efficiency of 34%.

Figure 3:
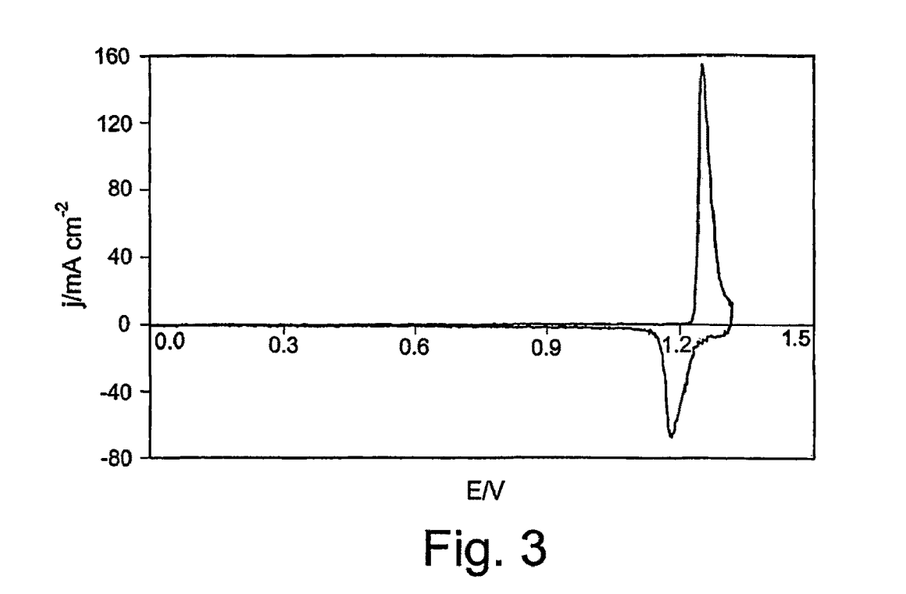
FIG. 3 shows the charge/discharge behaviour of a 200 ?m $H_I$ Ni disc based supercapacitor by cyclic voltammetry at 20 mV s$^{-1}$ separated by 1 cm in 6 M KOH.

FIG. 3 shows the cyclic voltammogram of the two-electrode electrochemical cell cycled in the potential range 0 V to 1.3 V. At approximately 1.22 V the device is charged, corresponding to the removal of protons from the $Ni(OH)_2$ and formation of NiOOH. Discharge occurs as protons from the Pd lattice move into the NiOOH structure reforming $Ni(OH)_2$ as indicated by the cathodic peak. The discharge current in this 20 mV $s^{-1}$ cycle peaks at 67 mA $cm^{-2}$ and the total charge passed is 257 mC $cm^{-2}$.

Figure 4:
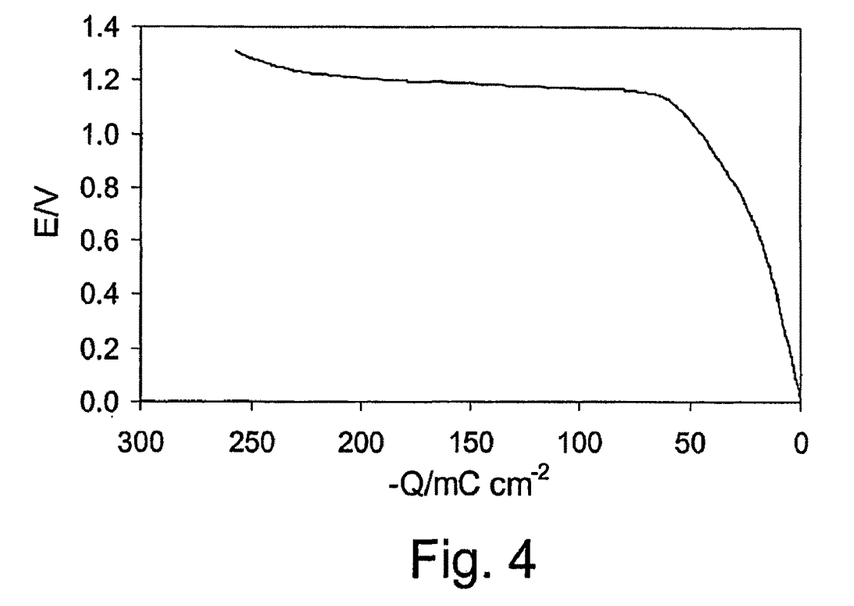
FIG. 4 shows the flow of charge from the device versus potential during the 20 mV s$^{-1}$ discharge depicted in FIG. 3.

The shape of the voltammogram of FIG. 3 more closely resembles that of a battery than a supercapacitor. Here, as is more clearly illustrated in FIG. 4, the majority of the charge on discharge is passed above 1.18 V.

Figure 5:
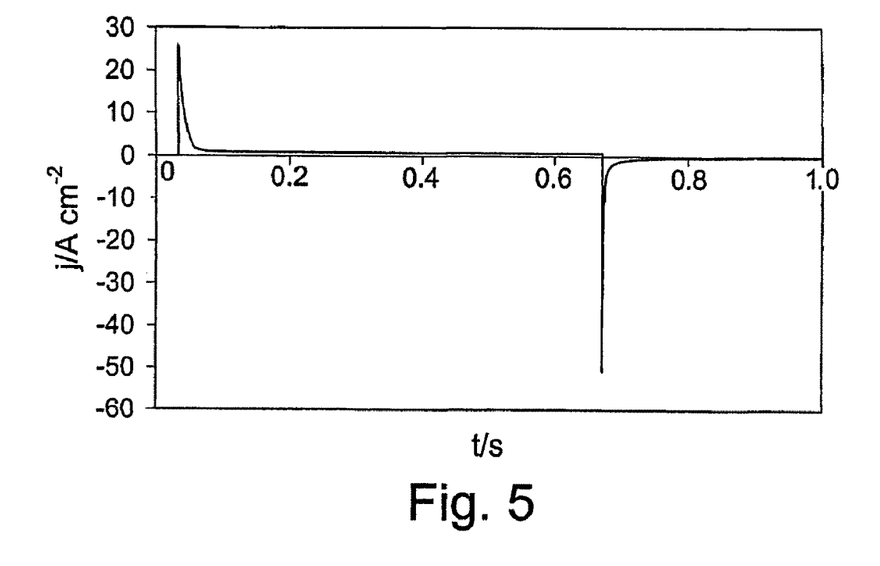
FIG. 5 shows the potential step charging/discharging of a $H_I$Ni/$H_I$ Pd supercapacitor in 6 M KOH composed of a 200 ?m $H_I$ Ni disc with a 1 cm$^2$ $H_I$ Pd electrode in 6 M KOH.

In order to determine how fast the electrochemical cell could be charged and discharged, the potential of the device was stepped between 0 V (discharged state) and 1.3 V (charged state) and the current response measured at 25° C. FIG. 5 shows a single charge/discharge step sequence. During the anodic spike 800 mC $cm^{-2}$ of charge is passed. Discharge of the device is represented by the large cathodic spike with a maximum amplitude of 50 A $cm^{-2}$ as protons move into the NiOOH. Here, 276 mC $cm^{-2}$ is passed during the discharge step, 222 mC $cm^{-2}$ ($7\times10^{-5}$ C over the 200 μm diameter or 166 mA.h $g^{-1}$) of which is passed in the first 50 ms.

(vi) Assembly and Testing of Cycle Life of Electrochemical Cell:

In order to examine cycle life, an electrochemical cell was assembled in a configuration consisting of mesoporous nickel and palladium electrodes, as prepared in (ii) and (iii) above, deposited onto 1 $cm^2$ evaporated gold substrates, the mesoporous Ni and mesoporous Pd electrodes being separated by a 6 M KOH filled porous PTFE membrane. The cyclability of the nickel-palladium electrochemical cell was investigated by continuously cycling the device at 500 mV $s^{-1}$ in the potential range 0 V to 1.2 V. All performance data are quoted in units with respect to the mass or geometric area of the nickel electrode.

Figure 6:
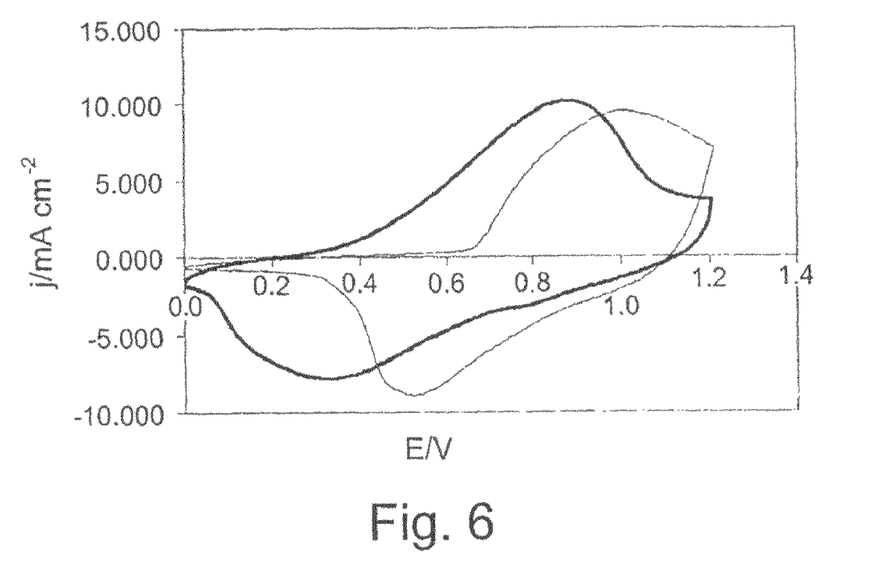
FIG. 6 shows a comparison of the first full cycle (—) of a 1 cm$^2$ $H_I$Ni/1 cm$^2$ $H_I$Pd supercapacitor incorporating a porous PIFE separator with the 15000$^{th}$ cycle (—)at 500 mV s$^{-1}$.

As illustrated in FIG. 6, the shape of the voltammogram is considerably different to that presented in FIG. 3. The peaks are considerably broader and are separated by approximately 0.5 V as opposed to only 0.07 V in FIG. 3. This is due to a combination of the IR limitation imposed on the cell with the introduction of the porous separator and the slow electrochemical response of the Pd, the capacity of which was not significantly larger than that of the $Ni(OH)_2$ electrode in this configuration. FIG. 6 compares the first full 4.8 s cycle with the 15000th. The similar form of voltammogram shows that the electrode has not deteriorated significantly during cycling. A shift in peak potentials towards lower values is believed to be due to oxygen ingress, decreasing the average hydrogen content of the palladium electrode and therefore increasing the potential of the negative electrode. An increase in the charge per cycle is believed to be due to thickening of the oxide layer during cycling.

Figure 7:
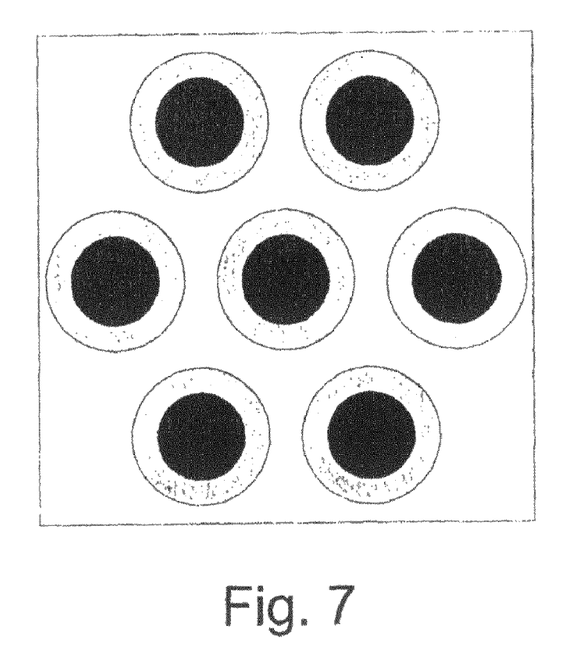
FIG. 7 represents a schematic drawing of the $H_I$ electrode structure showing a pore ringed by oxidised active material Ni(OH)$_2$ which is held in a matrix of a nickel current collector, and further showing the active material occupying 45% of the electrode bulk area.

This result has two implications. The first is that the mesoporous electrodes seem to resist the decrepitation on cycling that is associated with capacity decay in other supercapacitor and battery systems that utilize insertion processes. Thus, a uniform monolithic structure such as that illustrated in FIG. 7 appears to withstand the strain of volume expansion and contraction better than those consisting of an aggregation of sintered particles of non-uniform size distribution.

The second implication addresses the fact that not only does the mesoporous Ni electrode capacity resist decay, but actually increases with cycling. This effect is rationalized by understanding that in 6 M KOH under potential cycling conditions the amount of $Ni(OH)_2$ in a Ni electrode can increase with time as more of the Ni base metal is oxidized. In effect this increases the amount of active material in the electrode and hence the capacity. A number of groups have previously shown that the capacity of an electrodeposited Ni electrode may be increased by up to 30 times by application of the appropriate cycling conditions in alkaline solution. Here, such a large increase in capacity is not expected in the present arrangement, since during initial cycling already 45% by mass of the electrode material is utilised. In any case, a large increase in capacity corresponding to complete conversion of the Ni base metal to the electrically non-conducting $Ni(OH)_2$ would be undesirable since this would destroy the continuous path of Ni metal in the mesoporous electrode which provides electrocal conductivity and acts as a nanoscale current collector (see FIG. 7).

Example 3

Preparation of a Nanostructured Nickel/Iron Supercapacitor.

(i) Preparation of Nickel Substrates:

For the mesoporous nickel films, nickel foil (10 μm thick, 4 $cm^2$) was obtained from Johnson Matthey and was prepared as follows, for subsequent deposition of mesoporous nickel.

For the iron films, nickel foil (Goodfellow, 10 μm, 2 $cm^2$) was prepared as follows for the subsequent deposition of mesoporous iron.

The nickel foil substrates were cleaned in an ultrasound bath of isopropanol for 15 minutes prior to deposition, and then rinsed in de-ionised water and dried under ambient conditions.

(ii) Electrodeposition of Nickel from an Hexagonal Liquid Crystalline Phase:

A mixture having normal topology hexagonal ($H_I$) phase was prepared from 45 wt % of an aqueous solution of 0.2 M nickel (II) acetate, 0.5 M sodium acetate and 0.2 M boric acid, and 55 wt % of Brij 56 (Brij is a trade mark) nonionic surfactant ($C_{16}EO_n$ wherein n~10, from Aldrich). Electrodeposition onto the nickel foil substrate was carried out potentiostatically at −0.9 V vs. a saturated calomel electrode and at 25° C. using a platinum gauze counterelectrode, according to the method disclosed by Nelson et al., Chem. Mater., 2002, 14, 524-529. The total deposition charge was 2.0 C. After deposition, the films were washed in copious amounts of isopropanol for 24 hrs to remove the surfactant.

(iii) Electrodeposition of Iron from a Hexagonal Liquid Crystalline Phase:

A mixture having normal topology hexagonal ($H_I$) phase was prepared from a deoxygenated, 40 wt. % of aqueous solution of 0.2 M iron (II) sulphate and 60 wt. % Brij 56 nonionic surfactant ($C_{16}EO_n$ wherein n~10, Aldrich). Electrodeposition onto a nickel foil substrate (2 cm$^2$ in area) was carried out potentiostatically at 0.9 V vs. a saturated calomel electrode and at 25° C. using a platinum gauze counterelectrode. After passing 0.2 mAh of charge, the film was removed from the deposition mixture under cathodic protection by attaching the films to zinc foil immediately prior to the films being isolated from the deposition potential. The film, together with the zinc foil, was washed in copious amounts of deoxygenated acetone for 1 hour to remove the surfactant.

(iv) Examination of the Iron Electrode:

After washing, the iron electrode was immersed in 6 M aqueous KOH and the zinc was disconnected. The open circuit potential was measured and found to be 1.1V versus a charged nanostructured NiOOH electrode. Cyclic voltammetry experiments were carried out using a Solartron 1287 Electrochemical interface and Corrware software.

Figure 8:
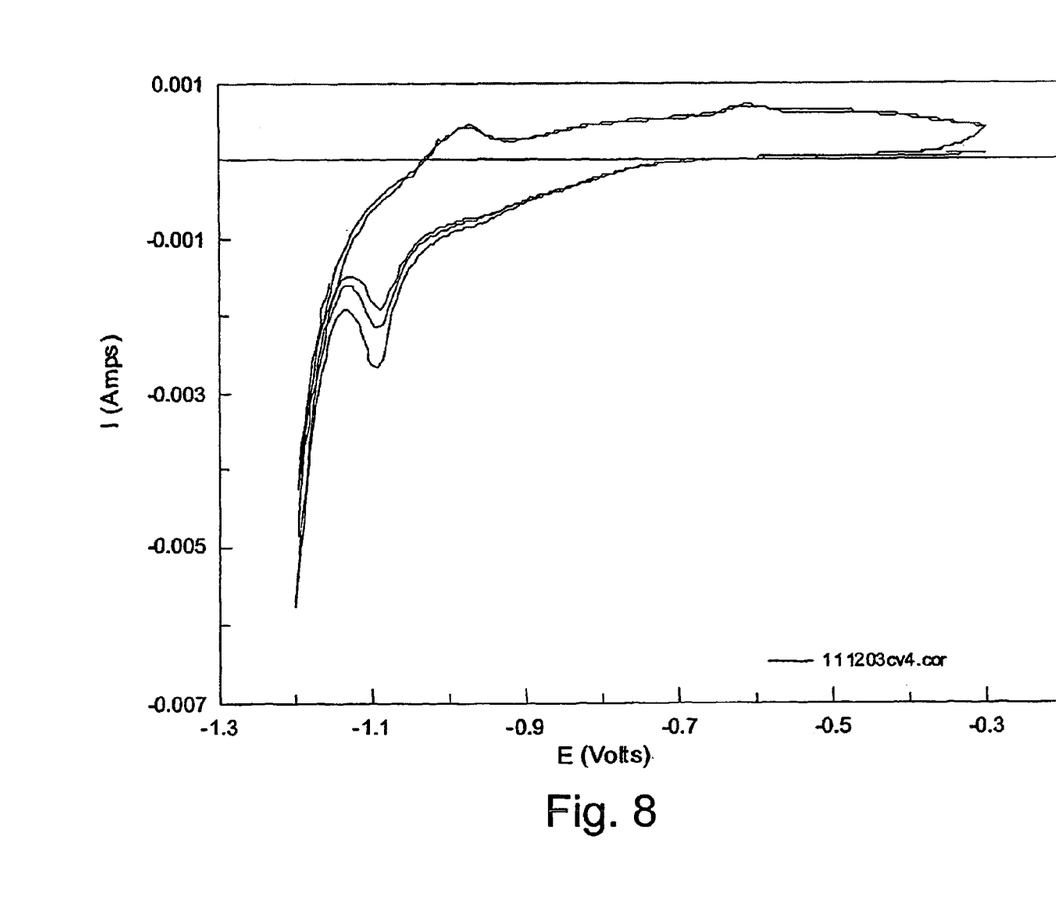
FIG. 8 shows a cyclic voltammogram of a liquid crystal templated iron electrode between −0.3 V and −1.2 V vs Hg/HgO in 6 M KOH at 20 mV s$^{-1}$ and 25° C., as prepared in Example 3.
Figure 9:
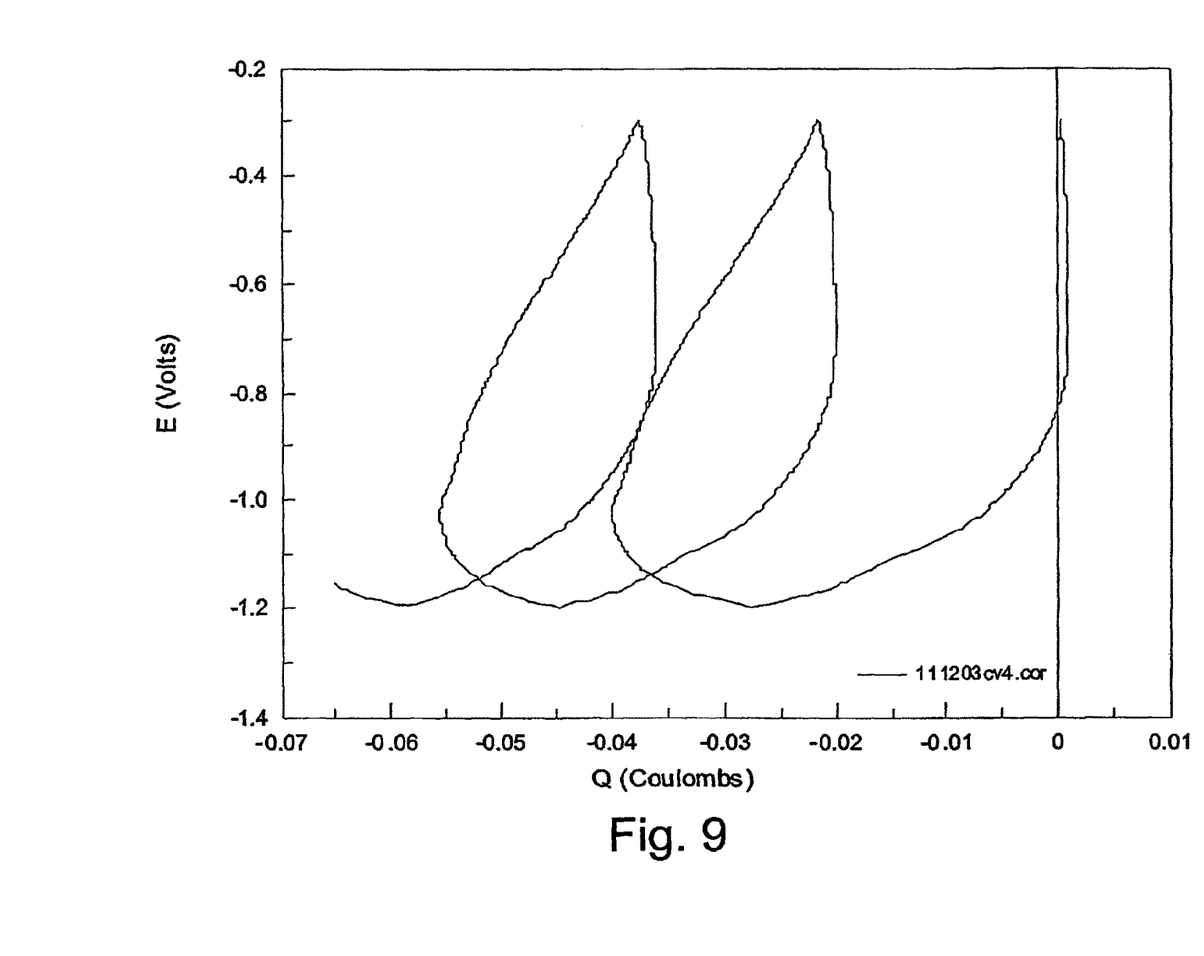
FIG. 9 shows the potential-charge relationship of the cyclic voltammogram shown in FIG. 8.

A cyclic voltammogram of the iron electrode in 6 M KOH was performed at 20 mV s$^{-1}$ and the result is shown in FIG. 8. This shows an anodic peak at −1.0 V vs. Hg/HgO and a cathodic peak at −1.1 V. The total charge passed between −1.0 V and −0.3 V in the anodic peak was 17 mC. The cathodic charge passed between −0.3 V and the interference of hydrogen evolution at −1.15V was 25 mC as shown in FIG. 8.

Figure 10:
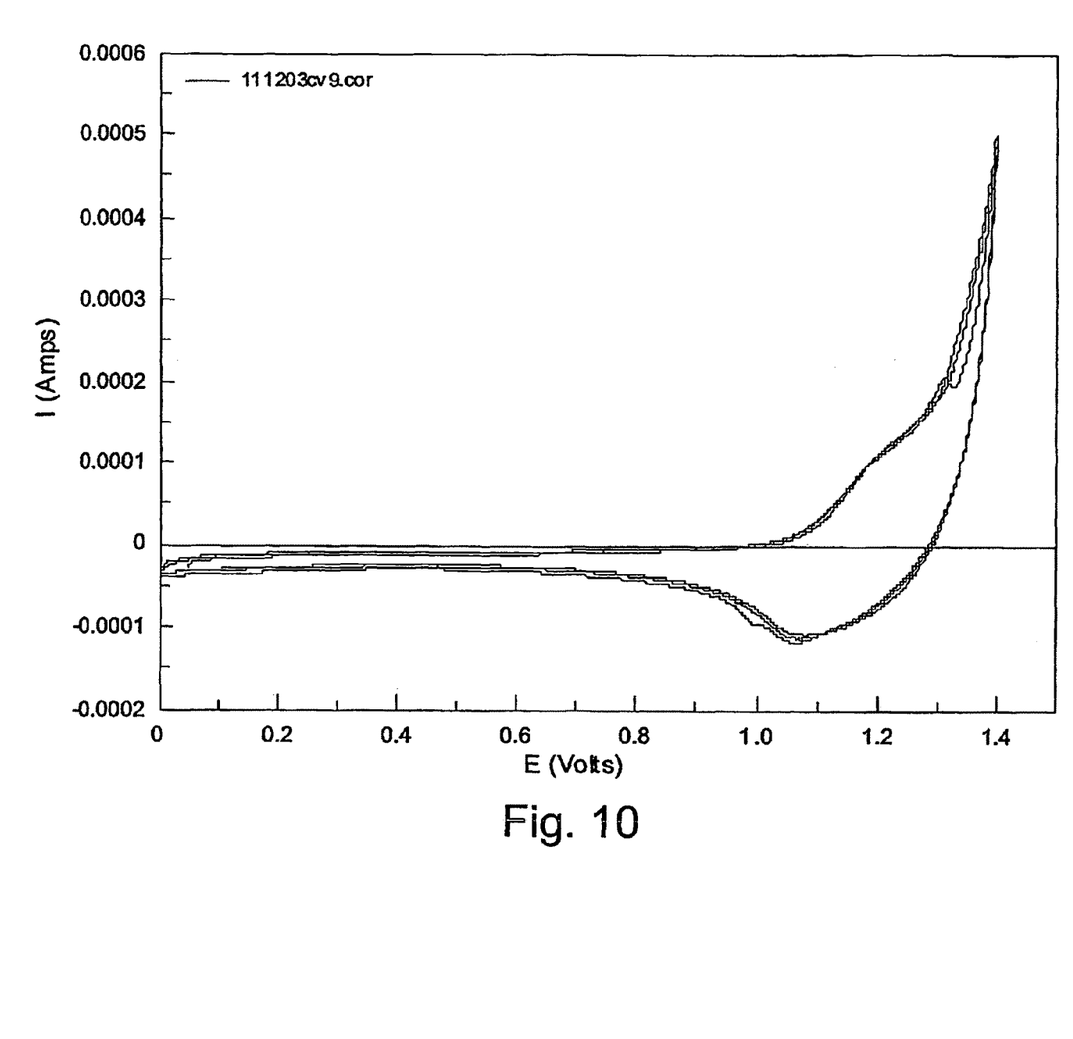
FIG. 10 shows a cyclic voltammogram of mesoporous nickel versus liquid crystal templated iron in a two electrode set-up between 0 V and 1.4 V in 6 M KOH at 5 mV s$^{-1}$ and 25° C., as prepared in Example 3.
Figure 11:
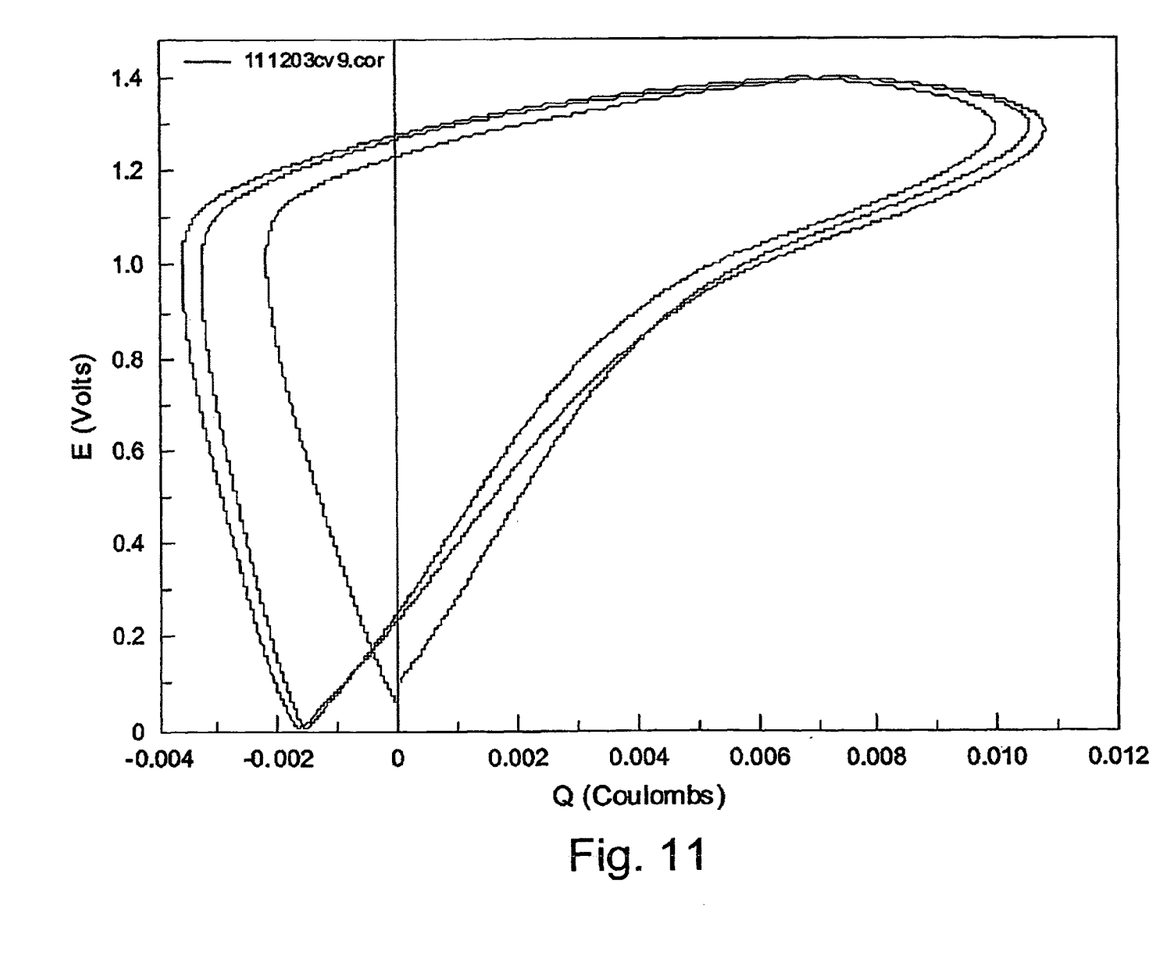
FIG. 11 shows the potential-charge relationship of the cyclic voltammogram shown in FIG. 10.

(v) Assembly and Testing of Charge/Discharge Characteristics of the Supercapacitor:

The iron and nickel electrodes prepared as described above were immersed into a 6M solution of KOH. The open circuit potential was measured and found to be 1.1 V. The two electrodes and the solution thus constituted our capacitor for cycling tests;

The potential of the newly prepared capacitor was cycled between 0 V and 1.4 V at 5 mV s$^{-1}$. FIG. 10 shows the cyclic voltammogram of the two-electrode supercapacitor. The discharge, plotted as a negative current, shows a broad peak around 1.1 V with a peak current of 0.15 mA. The total charge stored was found by integration of the voltammogram in FIG. 11 to be 12 mC.

The invention claimed is:

1. An electrochemical cell comprising a cathode, an anode and an electrolyte, wherein,
said cathode comprises a mesoporous structure fabricated via a liquid crystal templating process and comprising mesoporous nickel comprising a periodic arrangement of substantially uniformly sized pores of cross-section in the order of $10^{-9}$ to $10^{-8}$ m; and
said anode comprises a mesoporous structure fabricated via a liquid crystal templating process and comprising a mesoporous material having a periodic arrangement of substantially uniformly sized pores of cross-section in the order of $10^{-9}$ to $10^{-8}$ m, said anode made of carbon, cadmium, iron, a palladium/nickel alloy, an iron/titanium alloy, palladium or a mixed metal hydride.

2. An electrochemical cell according to claim 1, wherein said mesoporous structure of said cathode comprises nickel and an oxide, hydroxide or oxy-hydroxide of nickel selected from NiO, Ni(OH)$_2$ and NiOOH, said nickel oxide, hydroxide or oxy-hydroxide forming a surface layer over said nickel and extending over the pore surfaces.

3. An electrochemical cell according to claim 1, wherein said mesoporous structure of said cathode is comprised of nickel or alloys of nickel.

4. An electrochemical cell according to claim 3, wherein said nickel alloys are nickel alloys with a transition metal, nickel/cobalt alloys or iron/nickel alloys.

5. An electrochemical cell according to claim 1, wherein said mesoporous structure of said cathode or of said anode or both has a pore diameter in the range of about 1 to about 10 nm.

6. An electrochemical cell according to claim 5, wherein said pore diameter is in the range of about 2.0 to about 8.0 nm.

7. An electrochemical cell according to claim 1, wherein said mesoporous structure of said cathode or of said anode or both has a pore number density from about 4×10$^{11}$ to about 3×10$^{13}$ pores per cm$^2$.

8. An electrochemical cell according to claim 7, wherein said pore number density is in the range of about 1×10$^{12}$ to about 1×10$^{13}$ pores per cm$^2$.

9. An electrochemical cell according to claim 1, wherein at least 85% of the pores in said mesoporous structure of said cathode or of said anode or both have pore diameters within 30% of the average pore diameter.

10. An electrochemical cell according to claim 9, wherein at least 85% of the pores of said cathode or of said anode or both have pore diameters within 10% of the average pore diameter.

11. An electrochemical cell according to claim 9, wherein at least 85% of the pores of said cathode or of said anode or both have pore diameters within 5% of the average pore diameter.

12. An electrochemical cell according to claim 1, wherein said mesoporous structure of said cathode or of said anode or both has a hexagonal arrangement of pores that are continuous through the thickness of the electrode.

13. An electrochemical cell according to claim 12, wherein said hexagonal arrangement of pores has a pore periodicity in the range of 5 to 9 nm.

14. An electrochemical cell according to claim 1, wherein said mesoporous structure of said cathode or of said anode or both is a film having a thickness in the range of about 0.5 to about 5 micrometers.

15. An electrochemical cell according to claim 1, wherein said anode comprises carbon or palladium.

16. An electrochemical cell according to claim 1, wherein said mesoporous structure of said cathode comprises nickel and an oxide, hydroxide or oxy-hydroxide of nickel, forming a surface layer over said nickel and extending over at least the pore surfaces, and wherein said anode has a mesoporous structure comprising carbon or palladium.

17. An electrochemical cell according to claim 16, wherein said oxide, hydroxide or oxy-hydroxide of nickel is NiO, Ni(OH)$_2$ or NiOOH.

* * * * *